US012687811B2

(12) United States Patent
Takano

(10) Patent No.: US 12,687,811 B2
(45) Date of Patent: Jul. 21, 2026

(54) IMAGE FORMING APPARATUS WITH CONTROL OF SUCTION FORCES IN SUCTION FANS DURING SHEET CONVEYANCE

(71) Applicant: CANON KABUSHIKI KAISHA, Tokyo (JP)

(72) Inventor: Masashi Takano, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/031,082

(22) Filed: Jan. 17, 2025

(65) Prior Publication Data

US 2025/0164916 A1 May 22, 2025

Related U.S. Application Data

(63) Continuation of application No. 18/364,009, filed on Aug. 2, 2023, now Pat. No. 12,228,875.

(30) Foreign Application Priority Data

Aug. 9, 2022 (JP) ................................ 2022-126923

(51) Int. Cl.
*G03G 15/00* (2006.01)

(52) U.S. Cl.
CPC .................. *G03G 15/6529* (2013.01); *G03G 2215/00413* (2013.01)

(58) Field of Classification Search
None
See application file for complete search history.

(56) References Cited

U.S. PATENT DOCUMENTS 5,063,415 A 11/1991 Ariyama
2010/0244364 A1* 9/2010 Komiyama .......... B65H 29/242 271/99

(Continued)

FOREIGN PATENT DOCUMENTS

JP 2013117666 A 6/2013
JP 2021182062 A 11/2021

OTHER PUBLICATIONS

English language translation of JP 2013-117666, publication date Jun. 13, 2013. (Year: 2013).*

(Continued)

*Primary Examiner* — Leslie J Thompson
(74) *Attorney, Agent, or Firm* — ROSSI, KIMMS & McDOWELL LLP

(57) ABSTRACT

An image forming apparatus includes a transfer unit, a fixing unit, a conveyance unit, and a control unit. The control unit selectively performs a plurality of modes including a first mode and a second mode. The first mode is a mode in which, when a grammage of a sheet is a first grammage, if a leading edge of the sheet has reached the fixing unit, the control unit controls the first suction unit such that suction force of the first suction unit becomes first suction force. The second mode is a mode in which, when the grammage of the sheet is a second grammage smaller than the first grammage, if a leading edge of the sheet has reached the fixing unit, the control unit controls the first suction unit such that the suction force of the first suction unit becomes second suction force smaller than the first suction force.

10 Claims, 5 Drawing Sheets

(56) References Cited

U.S. PATENT DOCUMENTS

| | | | | |
|---|---|---|---|---|
| 2012/0087687 | A1 | 4/2012 | Moteki et al. | |
| 2021/0364955 | A1* | 11/2021 | Iwasaki | G03G 15/6529 |
| 2021/0364970 | A1* | 11/2021 | Sato | G03G 15/657 |
| 2022/0317623 | A1 | 10/2022 | Nagasaki | |

OTHER PUBLICATIONS

Office Action issued in U.S. Appl. No. 18/364,009 mailed Apr. 11, 2024.
Notice of Allowance issued in U.S. Appl. No. 18/364,009 mailed Oct. 23, 2024.

* cited by examiner

IMAGE FORMING APPARATUS WITH CONTROL OF SUCTION FORCES IN SUCTION FANS DURING SHEET CONVEYANCE

BACKGROUND OF THE INVENTION

Field of the Invention

This disclosure relates to an image forming apparatus forming an image on a sheet in one of a copier, a printer, a facsimile, or a multifunction machine including a plurality of these functions.

Description of the Related Art

In a case of forming images on sheets by an electrophotographic system, the sheets onto whose surfaces toner images have been transferred by transfer units are conveyed to fixing units, and the toner images are fixed on the sheets by the fixing units. So as to convey the sheets from the transfer units to the fixing units, suction conveyance units are widely used (refer to Japanese Patent Laid-Open No. 2013-117666). In this suction conveyance unit, a plurality of suction fans are disposed on an inner circumferential side of a single belt in which numerous through-holes are formed. The sheets conveyed from the transfer units are drawn onto the belts by the suction fans, and are conveyed with the sheets closely sucked onto the belts without lifting or detaching from the belts.

However, in the suction conveyance unit described in Japanese Patent Laid-Open No. 2013-117666 mentioned above, until a leading edge of the sheet enters a fixing nip portion, the suction force of the suction fans is set to the strength that is sufficient to suppress the lift and detachment of the sheet. Therefore, if, especially in a case of thin paper, the suction force of the suction fans is strong at a time when the leading edge of the sheet abuts against the fixing unit, since the sheet abutted against the fixing unit or portions adjacent to the fixing unit cannot form a sufficient amount of a loop and is stressed, there is the fear of the occurrence of wrinkles at a leading edge portion of the sheet. On the other hand, in a case where the suction force of the suction fans is too weak, since the sheet is lifted and detached from the belt, there is a possibility of defective conveyance.

The purpose of this disclosure is to provide an image forming apparatus that, while conveying the sheet with the sheet drawn onto the belt, can suppress the occurrence of the wrinkles when the leading edge of the sheet abuts against the fixing unit.

SUMMARY OF THE INVENTION

According to a first aspect of the present invention, an image forming apparatus includes a transfer unit including a transfer nip portion configured to nip and convey a sheet, the transfer unit being configured to transfer a toner image borne on an image bearing member onto the sheet nipped by the transfer nip portion, a fixing unit including a fixing nip portion configured to nip and convey the sheet, the fixing unit being configured to fix the toner image transferred onto the sheet by the transfer unit on the sheet, a conveyance unit configured to convey the sheet from the transfer unit toward the fixing unit, the conveyance unit including an endless belt having air permeability on which the sheet is supported, a stretching member configured to rotatably stretch the belt, and a plurality of suction units configured to suck the sheet onto the belt by drawing air via the belt, and a control unit configured to change suction force of the plurality of suction units. The plurality of suction units include a first suction unit disposed most downstream in a sheet conveyance direction and a second suction unit disposed upstream of the first suction unit in the sheet conveyance direction. The control unit is configured to selectively perform a plurality of modes including a first mode and a second mode. The first mode is a mode in which, in a case where a grammage of the sheet is a first grammage, in a state in which a leading edge of the sheet has reached the fixing unit, the control unit is configured to control the first suction unit such that suction force of the first suction unit becomes first suction force. The second mode is a mode in which, in a case where the grammage of the sheet is a second grammage smaller than the first grammage, in a state in which a leading edge of the sheet has reached the fixing unit, the control unit is configured to control the first suction unit such that the suction force of the first suction unit becomes second suction force smaller than the first suction force.

According to a second aspect of the present invention, an image forming apparatus includes a transfer unit including a transfer nip portion configured to nip and convey a sheet, the transfer unit being configured to transfer a toner image borne on an image bearing member onto the sheet nipped by the transfer nip portion, a fixing unit including a fixing nip portion configured to nip and convey the sheet, the fixing unit being configured to fix the toner image transferred onto the sheet by the transfer unit on the sheet, and a conveyance unit configured to convey the sheet from the transfer unit toward the fixing unit, the conveyance unit including an endless belt having air permeability on which the sheet is supported, a stretching member configured to rotatably stretch the belt, and a plurality of suction units configured to suck the sheet onto the belt by drawing air via the belt. The plurality of suction units include a first suction unit disposed most downstream in a sheet conveyance direction and a second suction unit disposed upstream of the first suction unit in the sheet conveyance direction. In a state in which a leading edge of the sheet has reached the fixing unit, suction force of the first suction unit is smaller than suction force of the second suction unit.

Further features of the present invention will become apparent from the following description of exemplary embodiments with reference to the attached drawings.

DESCRIPTION OF THE EMBODIMENTS

Figure 1:
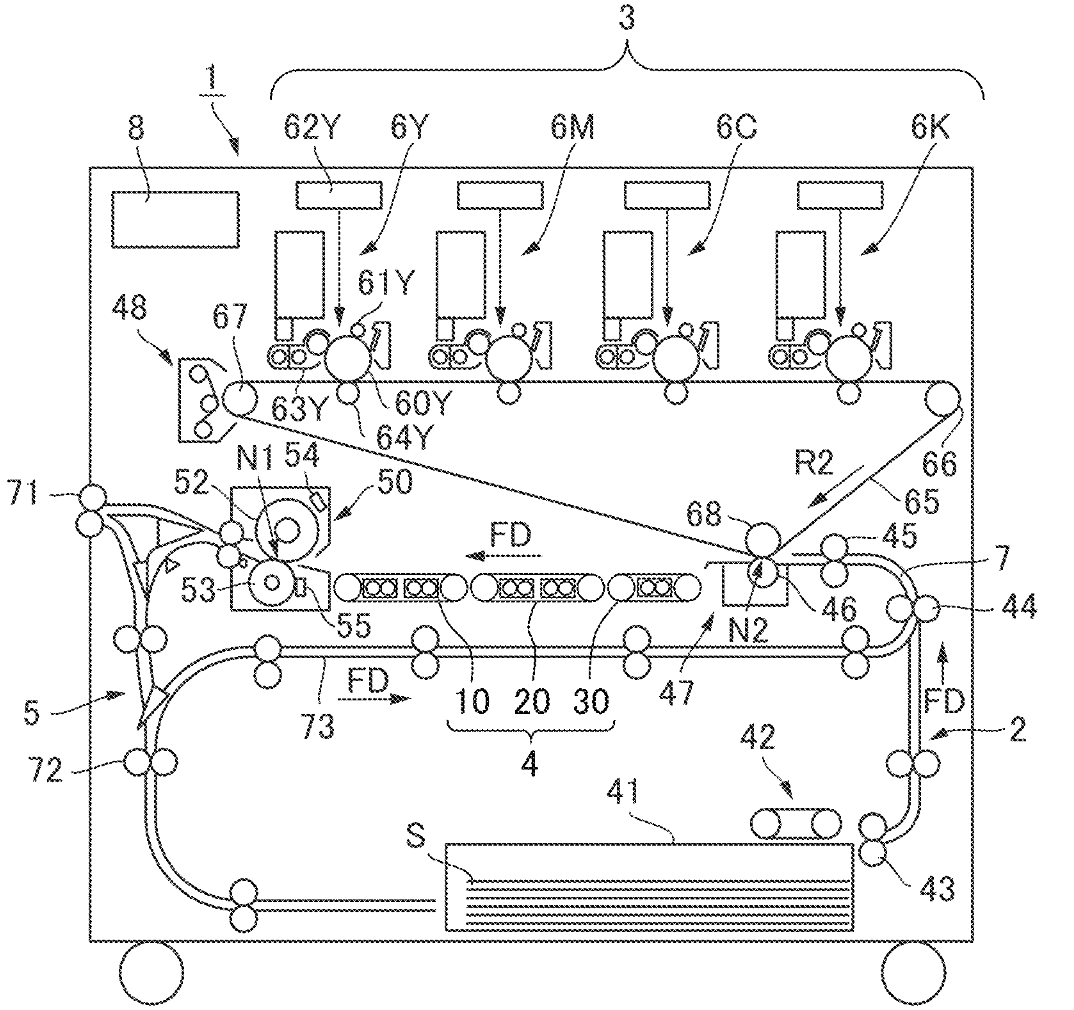
FIG. 1 is a cross-sectional view illustrating an image forming apparatus of an embodiment.

Hereinafter, the present embodiment will be described using drawings. First, a schematic configuration of an image forming apparatus of the present embodiment will be described using FIG. 1. FIG. 1 is a cross-sectional view illustrating the image forming apparatus 1 of the present embodiment.

Image Forming Apparatus

The image forming apparatus 1 includes a sheet feed unit 2 feeding a sheet S, an image forming unit 3 forming a toner image that is transferred onto the sheet S fed by the sheet feed unit 2, and a conveyance unit 4 conveying the sheet S, onto which the toner image has been transferred, to a fixing unit 50 using belts. Further, the image forming apparatus 1 includes a post-fixing conveyance unit 5 conveying the sheet S on which the toner image has been fixed by the fixing unit 50.

The sheet feed unit 2 includes a sheet cassette 41 storing the sheet S, a pickup roller 42 picking up the sheet S from the cassette 41, and a sheet separation unit 43 separating and feeding the sheet S picked up by the pickup roller 42. Further, the sheet feed unit 2 includes a delivery roller 44 conveying the sheet S in a sheet feed path 7 through which the sheet S separated and fed by the separation unit 43 is conveyed, and a registration roller 45. The image forming unit 3 is a so-called tandem type image forming unit in which electrophotographic system image forming stations 6Y, 6M, 6C, and 6K respectively forming toner images of yellow (Y), magenta (M), cyan (C), and black (K), are arranged in series.

The image forming stations 6Y, 6M, 6C, and 6K share a common configuration except for a difference in a color of toner. Therefore, here, as an example, the configuration of the image forming station 6Y will be described, and descriptions of the configurations of the image forming stations 6M, 6C, and 6K will be omitted. The image forming station 6Y includes a photosensitive drum 60Y, a charge unit 61Y, an exposing unit 62Y, a developing unit 63Y, and a primary transfer roller 64Y. The image forming unit 3 includes an intermediate transfer belt 65, serving as an example of an image bearing member that bears the toner images visualized by the image forming stations 6Y, 6M, 6C, and 6K. The intermediate transfer belt 65 is supported in a state of being stretched over a drive roller 66, a tension roller 67, and a secondary transfer inner roller 68, and rotatably driven in an arrow RB direction in FIG. 1 by the drive roller 66.

A secondary transfer outer roller 46 comes into pressure contact with the intermediate transfer belt 65 supported by the secondary transfer inner roller 68 from the inside, and forms a secondary transfer nip portion N2 with the intermediate transfer belt 65 in between. The secondary transfer nip portion N2 is an example of a transfer nip portion that nips and conveys the sheet S. A secondary transfer unit 47 is constituted by the secondary transfer outer roller 46, the intermediate transfer belt 65, and the secondary transfer inner roller 68. The secondary transfer unit 47 is an example of a transfer unit that transfers the toner image, borne on the intermediate transfer belt 65, onto the sheet S nipped in the secondary transfer nip portion N2. After the intermediate transfer belt 65 has passed through the secondary transfer nip portion N2, a cleaning unit 48 slidingly rubs the intermediate transfer belt 65 using a cleaning web, and removes such as transfer residual toner and paper dust remained on a surface of the intermediate transfer belt 65.

The fixing unit 50, arranged farther downstream than the secondary transfer unit 47 in a conveyance direction FD of the sheet S (sheet conveyance direction), fixes the toner image on the sheet S by heat and pressure. The fixing unit 50 includes a heating roller 52 incorporating a heater in the inside and an opposing roller 53 arranged in a manner capable of coming into contact with the heating roller 52 so as to form a fixing nip portion N1 with the heating roller 52. That is, the fixing unit 50 includes the fixing nip portion N1 that nips and conveys the sheet S, and fixes the toner image, which has been transferred onto the sheet S by the secondary transfer unit 47, on the sheet S.

The heating roller 52 is an example of a first rotary member that heats the sheet S, and the opposing roller 53 is an example of a second rotary member that forms the fixing nip portion N1 with the heating roller 52 in between. Further, the fixing unit 50 includes a heating roller temperature sensor 54, detecting a surface temperature of the heating roller 52, and an opposing roller temperature sensor 55, detecting a surface temperature of the opposing roller 53. The heating and opposing roller temperature sensors 54 and 55 are disposed so as to respectively maintain the surface temperatures of the heating roller 52 and the opposing roller 53 at appropriate temperatures.

The conveyance unit 4 is arranged between the secondary transfer unit 47 and the fixing unit 50 in the conveyance direction FD of the sheet S. The conveyance unit 4 is an example of a conveyance unit that conveys the sheet S from the secondary transfer unit 47 toward the fixing unit 50. The conveyance unit 4 is constituted by a first conveyance unit 10, a second conveyance unit 20, and a third conveyance unit 30 arranged in sequence from the downstream side in the conveyance direction FD of the sheet S. Details of the conveyance unit 4 will be described below.

The post-fixing conveyance unit 5 includes a sheet discharge roller 71 discharging the sheet S discharged from the fixing unit 50 to the outside of the image forming apparatus 1. The post-fixing conveyance unit 5 includes a reverse conveyance roller 72 performing the reverse conveyance of the sheet S, and a duplex conveyance path 73 through which the sheet S reversed by the reverse conveyance roller 72 is conveyed and joined to the sheet feed path 7.

Next, a sequence of processes for forming an image on the sheet S in the image forming apparatus 1 will be described. Based on an image forming job input to the image forming apparatus 1, the exposing unit 62Y of the image forming station 6Y exposes the photosensitive drum 60Y, and forms an electrostatic latent image on a surface of the photosensitive drum 60Y. The electrostatic latent image on the photosensitive drum 60Y is developed by the developing unit 63Y and visualized as the toner image. The toner image borne on the surface of the photosensitive drum 60Y is primarily transferred onto the intermediate transfer belt 65 by the primary transfer roller 64Y. Similarly, also in the other image forming stations 6M, 6C, and 6K, the toner image of each color is primarily transferred onto the intermediate transfer belt 65 in a sequentially superimposing manner. In the secondary nip portion N2, the toner image primarily transferred onto the intermediate transfer belt 65 is secondarily transferred onto the sheet S fed from the sheet feed unit 2.

The registration roller 45 puts the sheet S on standby by receiving the sheet S with rotation halted, and delivers the sheet S toward the secondary nip portion N2 in synchronization with a timing of the toner image on the intermediate transfer belt 65. The sheet S bearing the toner image transferred in the secondary transfer nip portion N2 is conveyed from the secondary transfer nip portion N2 to the fixing unit 50 by the conveyance unit 4. In the fixing unit 50, by applying the heat and pressure to an unfixed toner image with the sheet nipped in the fixing nip portion N1, the toner image is fixed on the sheet S. The sheet S delivered from the fixing unit 50 is discharged to the outside of the image forming apparatus 1 by the sheet discharge roller 71. In a case where the image is formed on both surfaces of the sheet S, the sheet S delivered from the fixing unit 50 is conveyed to the reverse conveyance roller 72, and, after having reversed by the reverse conveyance roller 72, is conveyed toward the duplex conveyance path 73. Then, the sheet S is conveyed to the conveyance path 7 again via the duplex conveyance path 73, and, as with a first surface (front surface), the toner image is formed on a second surface (back surface) of the sheet S.

Conveyance Unit

Figure 2:
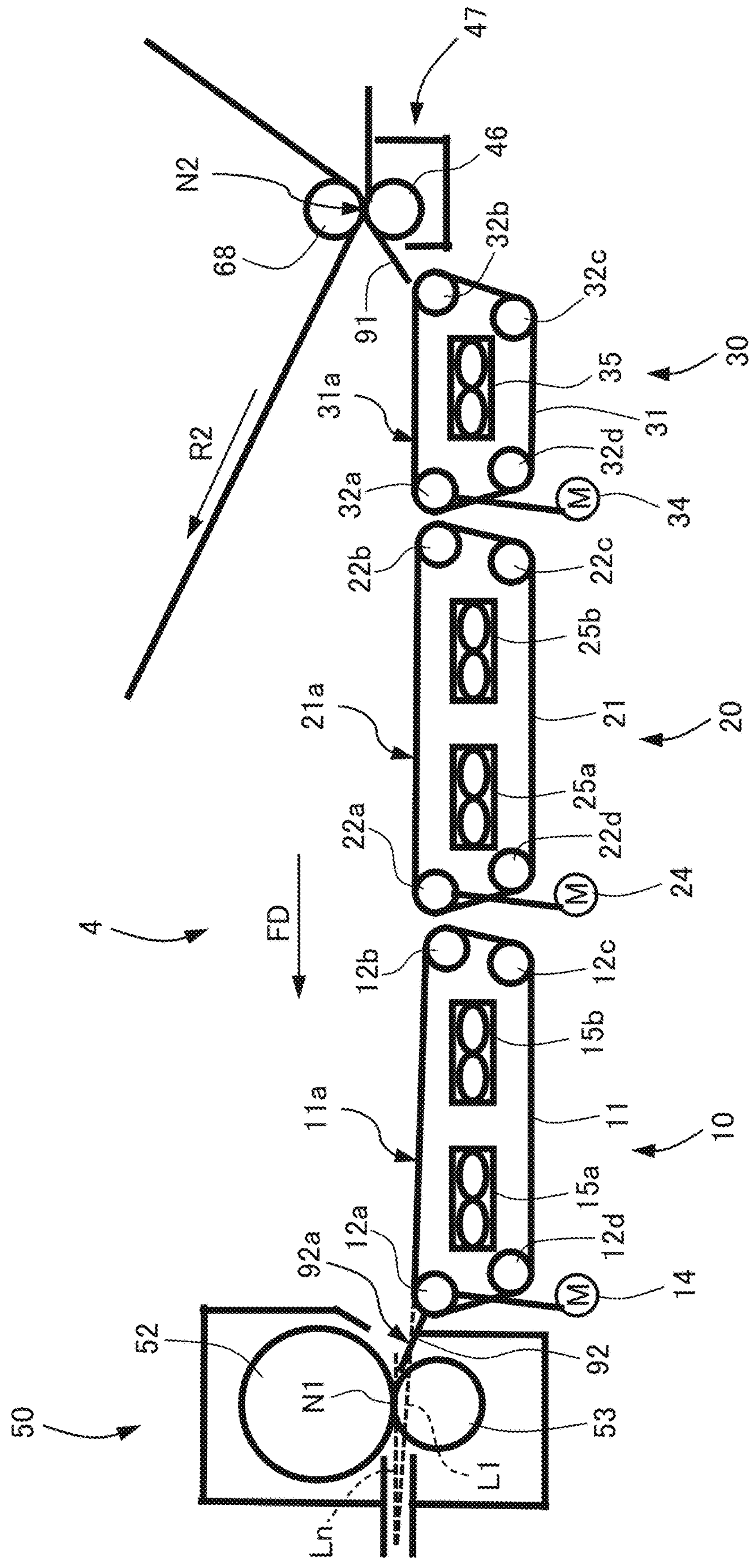
FIG. 2 is a cross-sectional view illustrating a conveyance unit conveying a sheet from a secondary transfer unit to a fixing unit of the image forming apparatus of the embodiment.

Next, with reference to FIG. 2, configurations of the conveyance unit 4 and its adjacent configurations will be described. FIG. 2 is a cross-sectional view illustrating the secondary transfer unit 47, the conveyance unit 4, and the fixing unit 50. The conveyance unit 4, serving as a conveyance unit, includes the first, second, and third conveyance units 10, 20, and 30. The first, second, and third conveyance units 10, 20, and 30 are arranged in sequence from the fixing nip portion N1 toward the secondary transfer nip portion N2, that is, from downstream toward upstream in the conveyance direction FD.

A post-secondary transfer guide 91 for guiding the sheet S conveyed from the secondary transfer nip portion N2 toward the conveyance unit 4 is disposed between the conveyance unit 4 and the secondary transfer nip portion N2 in the conveyance direction FD of the sheet S. Further, a pre-fixing guide 92 for guiding the sheet S conveyed by the conveyance unit 4 toward the fixing nip portion N1 is disposed between the conveyance unit 4 and the fixing nip portion N1 in the conveyance direction FD of the sheet S.

The first conveyance unit 10 includes a first conveyance belt 11, a first drive roller 12*a*, and first driven rollers 12*b*, 12*c*, and 12*d*. The first drive roller 12*a* and the first driven rollers 12*b*, 12*c*, and 12*d* rotatably stretch the first conveyance belt 11. The first conveyance belt 11 is an endless belt in which numerous holes are formed, and an example of a first belt that is constituted by a member having air permeability allowing air to pass through both of the inner and outer circumferential surfaces of the first conveyance belt 11 via the holes. The first drive roller 12*a* and the first driven rollers 12*b*, 12*c*, and 12*d* are examples of stretching members that rotatably stretch the first conveyance belt 11. The first conveyance unit 10 includes a first drive motor 14 rotatably driving the first conveyance belt 11 by rotating the first drive roller 12*a*.

The second conveyance unit 20 includes a second conveyance belt 21, a second drive roller 22*a*, and second driven rollers 22*b*, 22*c*, and 22*d*. The second drive roller 22*a* and the second driven rollers 22*b*, 22*c*, and 22*d* rotatably stretch the second conveyance belt 21. The second conveyance belt 21 is the endless belt in which the numerous holes are formed, and an example of a second belt that is constituted by a member having the air permeability allowing the air to pass through both of the inner and outer circumferential surfaces of the second conveyance belt 21 via the holes. The second conveyance unit 20 includes a second drive motor 24 rotatably driving the second conveyance belt 21 by rotating the second drive roller 22*a*.

The third conveyance unit 30 includes a third conveyance belt 31, a third drive roller 32*a*, and third driven rollers 32*b*, 32*c*, and 32*d*. The third drive roller 32*a* and the third driven rollers 32*b*, 32*c*, and 32*d* rotatably stretch the third conveyance belt 31. The third conveyance belt 31 is the endless belt in which the numerous holes are formed, and an example of a third belt that is constituted by a member having the air permeability allowing the air to pass through both of the inner and outer circumferential surfaces of the third conveyance belt 31 via the holes. The third conveyance unit 30 includes a third drive motor 34 rotatably driving the third conveyance belt 31 by rotating the third drive roller 32*a*.

The first conveyance unit 10 is arranged such that a sheet conveyance surface 11*a* of the first conveyance belt 11 is positioned below the fixing nip portion N1 in a vertical direction. The third conveyance unit 30 is arranged such that a sheet conveyance surface 31*a* of the third conveyance belt 31 is positioned below the secondary transfer nip portion N2 in the vertical direction. The second conveyance unit 20 is arranged such that, in the conveyance direction FD, an upstream portion of a sheet conveyance surface 21*a* of the second conveyance belt 21 is positioned below a downstream portion of the sheet conveyance surface 31*a* in the vertical direction, and a downstream portion of the sheet conveyance surface 21*a* is positioned above an upstream portion of the sheet conveyance surface 11*a* of the first conveyance unit 10 in the vertical direction. That is, the first conveyance belt 11 is arranged most downstream in the conveyance direction FD, and the second conveyance belt 21 is arranged farther upstream in the conveyance direction FD than the first conveyance belt 11.

In the present embodiment, when viewed in a width direction perpendicular to the conveyance direction FD of the sheet S, an imaginary line L1 extended downstream in the conveyance direction FD from the sheet conveyance surface 11*a* intersects with a nip line Ln of the fixing nip portion N1 at a position farther downstream in the conveyance direction FD than the fixing nip portion N1. The nip line Ln of the fixing nip portion N1 refers to a tangent that, among tangents of the fixing nip portion N1, comes into contact with both of the heating roller 52 and the opposing roller 53. That is, the nip line Ln refers to a straight line perpendicular to a line connecting centers of the heating roller 52 and the opposing roller 53, and a straight line that overlaps with the fixing nip portion N1. With this configuration, the sheet S which has been conveyed on the first conveyance unit 10 is conveyed in a direction intersecting from below toward above with respect to the nip line Ln.

The pre-fixing guide 92 is disposed between the first conveyance unit 10 and the fixing unit 50 in the conveyance direction FD. The pre-fixing guide 92 includes a guide surface 92*a* that guides a leading edge of the sheet S conveyed on the sheet conveyance surface 11*a* toward the fixing nip portion N1. In the present embodiment, the guide surface 92*a* guides the leading edge of the sheet S toward an upper portion of the opposing roller 53. That is, the pre-fixing guide 92 is an example of a guide member, and guides the leading edge of the sheet S conveyed downstream from the conveyance unit 4 to the fixing nip portion N1 such that the leading edge of the sheet S abuts against the opposing roller 53.

When viewed in the width direction, the guide surface 92*a* of the pre-fixing guide 92 intersects with the imaginary line L1 of the sheet conveyance surface 11*a* at a position downstream of the first conveyance unit 10 and upstream of the fixing nip portion N1 in the conveyance direction FD. That is, the guide surface 92*a* intersects with the imaginary line L1 which is seen when an imaginary plane extending the sheet conveyance surface 11*a* downstream in the conveyance direction FD is viewed from the width direction. With this configuration, the sheet S which has been conveyed on the first conveyance unit 10 is guided from a side of the opposing roller 53 to the fixing nip portion N1 by the pre-fixing guide 92 in a state of intersecting from below toward above with respect to the nip line Ln.

Since, as described above, the sheet S is conveyed to the fixing nip portion N1 in the state of intersecting from below toward above with respect to the nip line Ln, it is possible to suppress the contact of the heating roller 52 with respect to unfixed toner on the sheet S. Further, the pre-fixing guide 92 guides the sheet S to the fixing nip portion N1 such that the leading edge of the sheet S abuts against the opposing roller 53. Therefore, even if the leading edge of the sheet S conveyed from the first conveyance unit 10 is tilted slightly upward from a set conveyance path due to such as component tolerances and the curvature of the sheet S, it is possible to prevent the leading edge of the sheet S from coming into contact with the heating roller 52 at a position above the fixing nip portion N1. Thereby, it is possible to suppress the deterioration of image quality led by the occurrence of sheet waviness caused by the contact of the leading edge of the sheet S with the heating roller 52 at the position above the fixing nip portion N1.

A first downstream fan 15*a*, which is an example of a first suction unit that sucks the sheet S onto the sheet conveyance surface 11*a* of the first conveyance belt 11, and a first upstream fan 15*b*, which is an example of a second suction unit, are arranged in the interior of the first conveyance belt 11. That is, the first conveyance unit 10 includes the first downstream and upstream fans 15*a* and 15*b*, which are examples of a plurality of suction units capable of sucking the sheet S onto the first conveyance belt 11 by drawing the air via the first conveyance belt 11. The first downstream fan 15*a* is arranged most downstream in the conveyance direction FD among the plurality of suction units, and the first upstream fan 15*b* is arranged father upstream than the first downstream fan 15*a* in the conveyance direction FD. The first downstream and upstream fans 15*a* and 15*b* apply suction force required for conveying the sheet S to the sheet conveyance surface 11*a* by drawing the air from the outside toward the inside of the sheet conveyance surface 11*a* via the numerous holes formed in the first conveyance belt 11.

In the interior of the second conveyance belt 21, a second downstream fan 25*a* and a second upstream fan 25*b* sucking the sheet S onto the sheet conveyance surface 21*a* of the second conveyance belt 21 are arranged. The second downstream and upstream fans 25*a* and 25*b* apply the suction force required for conveying the sheet S to the sheet conveyance surface 21*a* by drawing the air from the outside toward the inside of the sheet conveyance surface 21*a* via the numerous holes formed in the second conveyance belt 21.

In the interior of the third conveyance belt 31, a third fan 35 sucking the sheet S onto the sheet conveyance surface 31*a* of the third conveyance belt 31 is arranged. The third fan 35 applies the suction force required for conveying the sheet S to the third conveyance surface 31*a* by drawing the air from the outside toward the inside of the sheet conveyance surface 31*a* via the numerous holes formed in the third conveyance belt 31.

It is possible to set an airflow volume individually for each of the fans 15*a*, 15*b*, 25*a*, 25*b*, and 35 of the conveyance unit 4. In the first and second conveyance units 10 and 20, it is possible to set a difference in the suction force drawing the sheet S between the upstream and downstream fans within the same conveyance unit.

Control System

Figure 3:
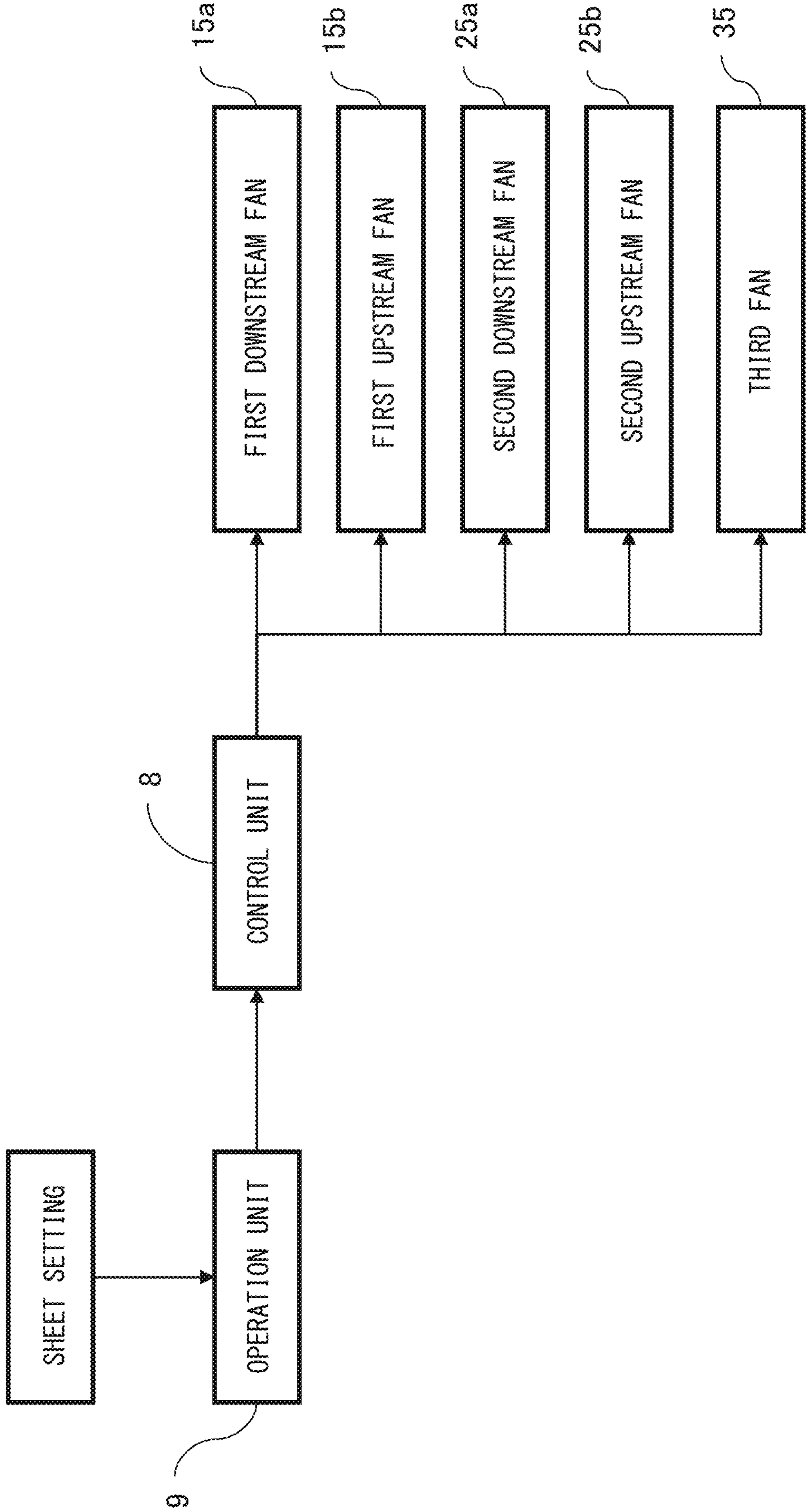
FIG. 3 is a block diagram illustrating a configuration of a control system of the image forming apparatus of the embodiment.

FIG. 3 is a block diagram illustrating a control system of the present embodiment. The image forming apparatus 1 includes a control unit 8, and the motors, driving the respective fans of the conveyance unit 4, are controllably coupled to the control unit 8. The control unit 8 includes hardware configurations, not shown, such as a central processing unit (CPU), a random access memory (RAM), and a read only memory (ROM). In the control unit 8, these hardware configurations are included so as to perform various functions using such as programs. When sheet settings are input to an operation unit 9, the control unit 8 can change the suction force by varying the airflow volume of each of the fans 15*a*, 15*b*, 25*a*, 25*b*, and 35 depending on the input sheet settings.

The control unit 8 can perform one of a plurality of modes including a first mode, a second mode, and a third mode, which are different from each other in the suction force of the first downstream fan 15*a*. In the first mode, the suction force of the first downstream fan 15*a* is controlled so as to become first suction force. In the second mode, the suction force of the first downstream fan 15*a* is controlled so as to become second suction force smaller than the first suction force. In the third mode, the suction force of the first downstream fan 15*a* is controlled so as to become third suction force smaller than the second suction force.

Here, the first suction force refers to, for example, the suction force that is equivalent to the suction force of the first upstream fan 15*b*, and, for example, 75 to 100% of maximum suction force of the first downstream fan 15*a*. The second suction force refers to, for example, the suction force that is equivalent to, for example, about 40 to 60% of the maximum suction force of the first downstream fan 15*a*, and, in the present embodiment, is set to 50% of the maximum suction force. The third suction force refers to, for example, the suction force that is equivalent to, for example, about 20 to 30% of the maximum suction force of the first downstream fan 15*a*, and, in the present embodiment, is set to 25% of the maximum suction force. That is, at a time of performing the second or third mode, in a state in which the leading edge of the sheet S has reached the fixing unit 50, the suction force of the first downstream fan 15*a* is smaller than the suction force of the first upstream fan 15*b*.

In a case where a grammage of the sheet S is a first grammage, in the state in which the leading edge of the sheet S has reached the fixing unit 50, the control unit 8 performs the first mode such that the suction force of the first downstream fan 15*a* becomes the first suction force. Here, the first grammage is a grammage that is equal to or larger than a predetermined grammage. In a case where, for example, the predetermined grammage is 200 grams per square meter (gsm), the grammage of the sheet S is equal to or more than 200 gsm, and, for example, cardboard is included in this range.

In a case where the grammage of the sheet S is a second grammage that is smaller than the first grammage, in the state in which the leading edge of the sheet S has reached the fixing unit 50, the control unit 8 performs the second mode such that the suction force of the first downstream fan 15*a* becomes the second suction force. Here, the second grammage is a grammage of, for example, 100 gsm to 200 gsm, and, for example, thin paper is included in this range.

In a case where the grammage of the sheet S is a third grammage that is smaller than the second grammage, in the state in which the leading edge of the sheet S has reached the fixing unit 50, the control unit 8 performs the third mode such that the suction force of the first downstream fan 15*a* becomes the third suction force. Here, the third grammage is a grammage of, for example, 50 gsm to 100 gsm, and, for example, the thin paper is included in this range.

To be noted, in the present embodiment, upon the conveyance of the sheet S from the secondary transfer unit 47, the control unit 8 sets the suction force of the first downstream fan 15*a*, and performs one of the first to third modes. Then, the control unit 8 directs the sheet S to enter the fixing unit 50 while maintaining the suction force of the first downstream fan 15*a* constant. That is, the control unit 8 maintains the suction force of the first downstream fan 15*a* constant during a time when performing one of the plurality of modes. Further, while specific numerical values are provided for the grammage, these are only examples and not exclusive.

Fan Setting at a time of Conveying Thin Paper

Figure 4:
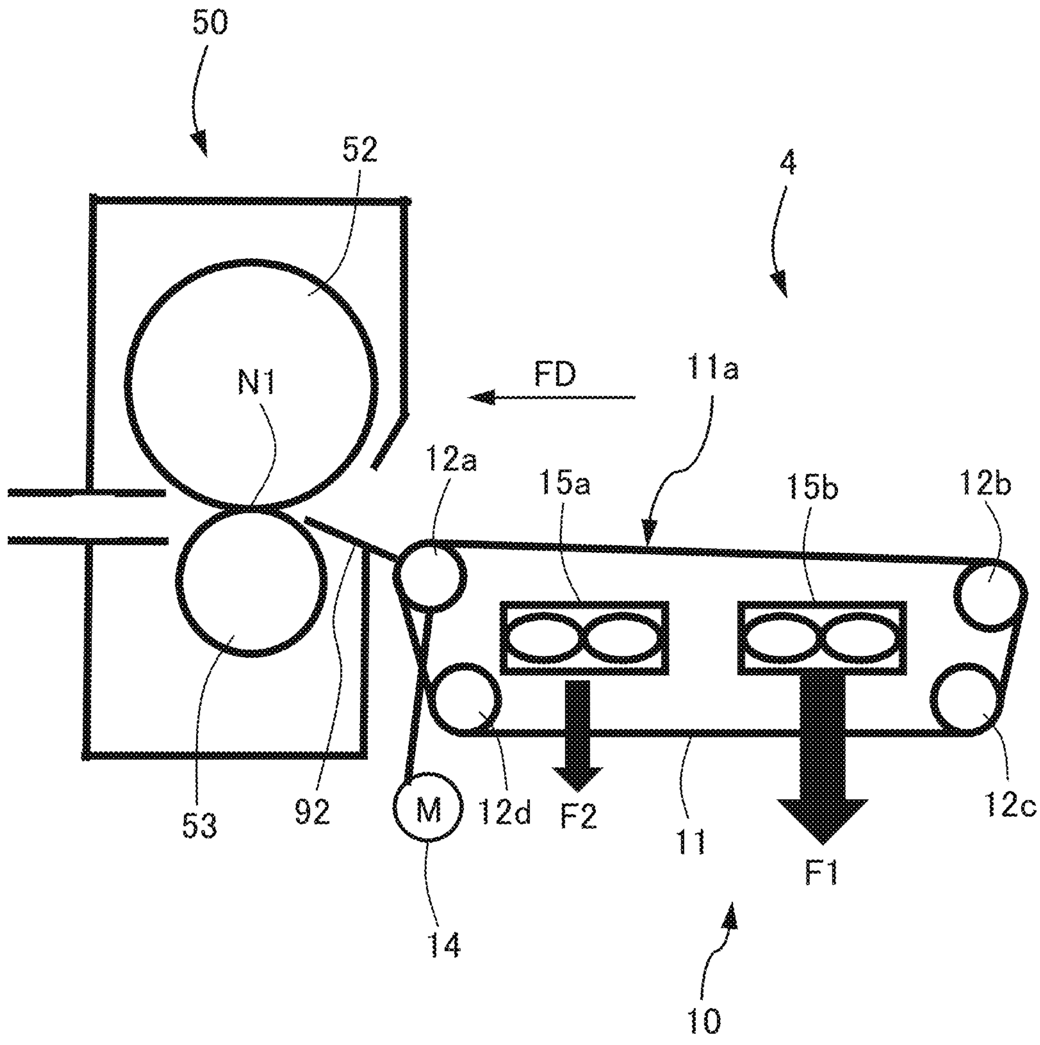
FIG. 4 is a cross-sectional view illustrating a state in which thin paper is conveyed by the conveyance unit of the embodiment.

FIG. 4 illustrates settings of the first downstream and upstream fans 15*a* and 15*b* at a time of the conveyance of the thin paper. In the first, second, and third conveyance units 10, 20, 30, so as not to lift and detach the sheet S, it is necessary to generate suction force F1 that is sufficiently strong to suck the sheet S onto the first, second, and third conveyance belts 11, 12, and 13.

However, in the conveyance of the thin paper, if, at a time when the leading edge of the sheet S penetrates into the fixing nip portion N1, the sheet S is drawn to the first conveyance belt 11 with strong force, the suction force and nipping force, which is exerted from the fixing nip portion N1, will act upon the sheet S, and, thus, there is a possibility of the occurrence of wrinkles in the sheet S. Therefore, an airflow volume of the first upstream fan 15*b* arranged in the interior of the first conveyance unit 10 is regulated such that the first upstream fan 15*b* generates the suction force F1 that is sufficiently strong to suck the sheet S onto the first conveyance belt 11. Further, by regulating an airflow volume of the first downstream fan 15*a* such that the first downstream fan 15*a* generates suction force F2 that is minimum suction force required for conveying the sheet, it becomes possible to reduce the lift and detachment of the sheet S and the occurrence of the wrinkles in the sheet S. That is, the control unit 8 performs the second or third mode. Further, depending on the grammage of the sheet S input to the control unit 8 in the sheet setting, the control unit 8 changes the strength of the suction force F1 that is sufficiently strong to suck the sheet S onto the first conveyance belt 11 and the strength of the suction force F2 that is the minimum suction force required for conveying the sheet S. Thereby, in the conveyance unit 4 between the secondary transfer unit 47 and the fixing unit 50, high velocity sheet conveyance is made possible, while reducing the lift and detachment of the sheet S during the conveyance and the possibility of the occurrence of the wrinkles at a time of the penetration of the sheet S into the fixing nip portion N1.

Fan Setting at a Time of Conveying Thick Paper

Figure 5:
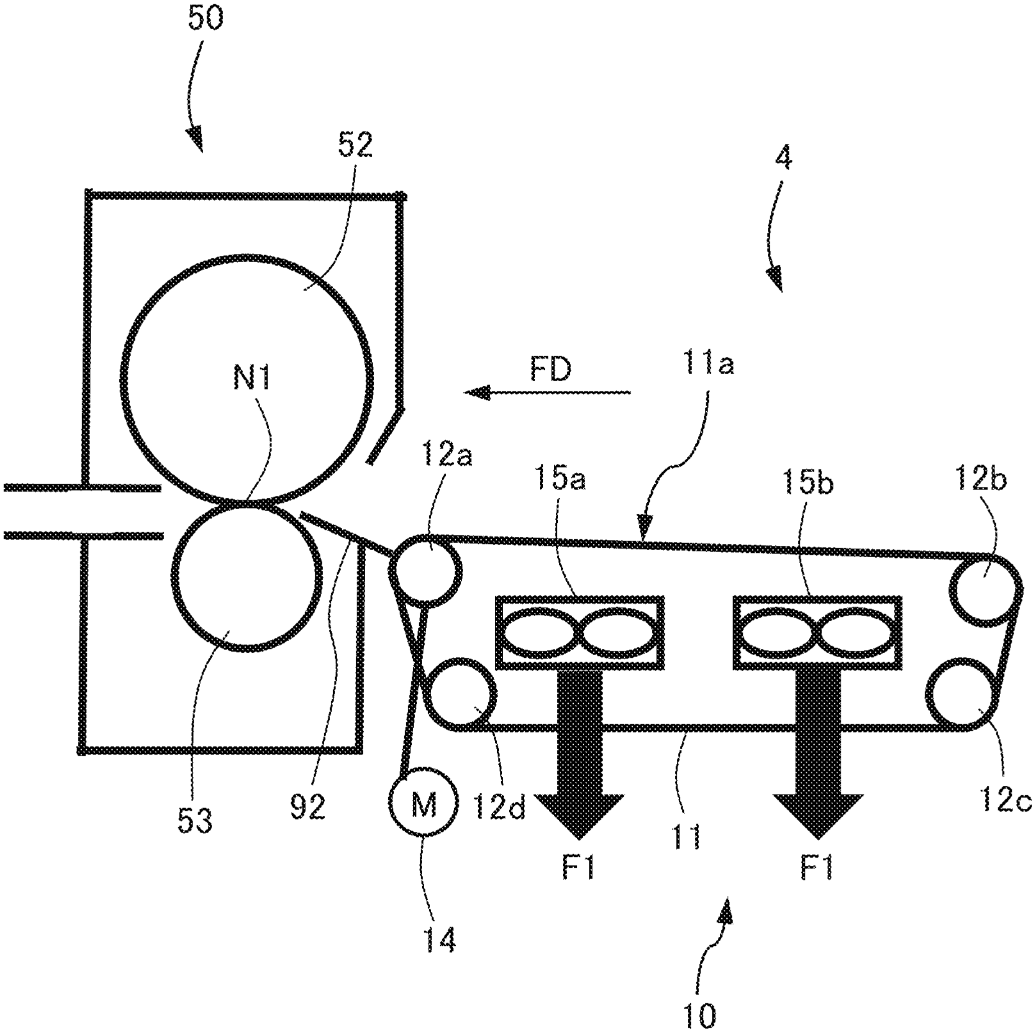
FIG. 5 is a cross-sectional view illustrating a state in which thick paper is conveyed by the conveyance unit of the embodiment.

FIG. 5 illustrates settings of the first downstream and upstream fans 15*a* and 15*b* at a time of conveying the thick paper. In the conveyance of the thick paper, if the sheet S is conveyed using the setting of the suction force applied at a time of conveying the thin paper described above, since the conveyance force is not sufficient, it becomes difficult to convey the sheet S across an inclined surface, inclined with respect to the conveyance direction FD, of the pre-fixing guide 92. Therefore, in a case of conveying the thick paper, even in the first conveyance unit 10, the airflow volume of the first downstream fan 15*a* is regulated such that the suction force becomes the suction force F1 that is the same as the first upstream fan 15*b* and sufficiently strong to suck the sheet S onto the belt. That is, the control unit 8 performs the first mode. Thereby, it is possible to ensure the conveyance force sufficiently strong to pass the sheet S across the pre-fixing guide 92. Further, in the conveyance of the thick paper, since a possibility of the occurrence of the wrinkles related to the penetration into the fixing nip portion N1 is low, the suction force of the first downstream fan 15*a* can be equivalent to the suction force of the first upstream fan 15*b*. Further, the strength of the suction force F1 sufficiently strong to suck the sheet S onto the first conveyance belt 11 is varied depending on the grammage of the sheet S input to the control unit 8 in the sheet setting.

As described above, according to the image forming apparatus 1 of the present embodiment, in a case where the grammage of the sheet S is small, the suction force of the first downstream fan 15*a* is regulated to be small. Therefore, it becomes possible to reduce the lift and the detachment of the sheet S and the occurrence of the wrinkles in the sheet S. Thereby, while conveying the sheet S with the sheet S drawn onto the first conveyance belt 11, it is possible to suppress the occurrence of the wrinkles at a time when the leading edge of the sheet S abuts against the fixing nip portion N1.

Further, according to the image forming apparatus 1 of the present embodiment, since the control unit can perform one of three modes of the first to third modes, it is possible to perform fine-grained control. Therefore, while conveying the sheet S with the sheet S drawn onto the first conveyance belt 11, it is possible to more effectively suppress the occurrence of the wrinkles at a time when the leading edge of the sheet S abuts against the fixing nip portion N1.

To be noted, while, in the embodiment described above, the suction force of the first downstream fan 15*a* is set upon the conveyance of the sheet S from the secondary transfer unit 47 and is maintained until the sheet S enters the fixing unit 50, it is not limited to this. For example, it is acceptable to vary the suction force of the first downstream fan 15*a* based on the grammage of the sheet S at a time when the sheet S has reached the second or first conveyance unit 20 or 10 after the sheet S was conveyed from the secondary transfer unit 47. In this case, since, even in a case where a plurality of sheets of the sheet S are conveyed at the same time by the conveyance unit 4, it is possible to set appropriate suction pressure of the first downstream fan 15*a* for each sheet, it is possible to suppress the occurrence of the wrinkles in a leading edge portion of the sheet S without decreasing productivity.

Further, while, in the embodiment described above, the control unit 8 can perform one of the three modes of the first to third modes, it is not limited to this. For example, it is acceptable that the control unit can perform only one of the first and second modes or one of the plurality of modes including equal to or more than four modes. Further, it is not limited to a stepwise change of the suction force depending on the grammage, and, for example, it is acceptable to change the suction force in a linear manner such that the suction force decreases as the grammage decreases.

Further, while, in the embodiment described above, the first conveyance unit 10 includes two fans 15*a* and 15*b*, it is not limited to this, and it is acceptable that the first conveyance unit 10 includes equal to or more than three fans. Also in this case, the first downstream fan 15*a* is arranged in a position most downstream among equal to or more than three fans. Further, while the conveyance unit 4 includes three belts 11, 21, and 31, it is not limited to this, and the number of belts can be one, two, four, or more. In all of the cases described above, the suction force of the first downstream fan 15*a* arranged in an interior of a belt which is most downstream in the conveyance unit 4 in the conveyance direction FD is varied.

According to this disclosure, while conveying the sheet with the sheet drawn onto the belt, it is possible to suppress the occurrence of the wrinkles at a time when the leading edge of the sheet abuts against the fixing unit.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-126923, filed Aug. 9, 2022 which is hereby incorporated by reference herein in its entirety.

What is claimed is:

1. An image forming apparatus comprising:

a transfer unit including a transfer nip portion configured to nip and convey a sheet, the transfer unit being configured to transfer a toner image borne on an image bearing member onto the sheet nipped by the transfer nip portion;

a fixing unit including a fixing nip portion configured to nip and convey the sheet, the fixing unit being configured to fix the toner image transferred onto the sheet by the transfer unit on the sheet;

a conveyance unit configured to convey the sheet from the transfer unit toward the fixing unit, the conveyance unit including:

an endless belt configured to convey the sheet supported on a conveyance surface of the endless belt;

a first suction fan configured to suck the sheet onto a first area of the conveyance surface; and a second suction fan configured to suck the sheet onto a second area of the conveyance surface, the second area being upstream of the first area in a sheet conveyance direction;

a guide configured to guide the sheet conveyed by the endless belt to the fixing unit, the guide being located intersecting with an imaginary plane extending the conveyance surface of the endless belt as viewed in a sheet width direction intersecting with the sheet conveyance direction; and a control unit configured to control a suction force of the first suction fan and a suction force of the second suction fan so that:

the suction force of the first suction fan is smaller than the suction force of the second suction fan before a leading end of the sheet reaches the fixing nip portion; and the suction force of the first suction fan remains smaller than the suction force of the second suction fan in a state where the leading end of the sheet reaches the fixing nip portion.

2. The image forming apparatus according to claim 1, wherein the conveyance unit further includes:

a first supporting roller configured to support the endless belt; and a second supporting roller configured to support the endless belt, the second supporting roller being disposed downstream of the first supporting roller in the sheet conveyance direction.

3. The image forming apparatus according to claim 2, wherein the conveyance surface of the endless belt is arranged parallel to a common tangent line to the first supporting roller and the second supporting roller.

4. The image forming apparatus according to claim 1, wherein the control unit is configured to change the suction force of the first suction fan based on a grammage of the sheet conveyed by the endless belt.

5. The image forming apparatus according to claim 1, wherein:

the endless belt is a first endless belt, and the conveyance surface is a first conveyance surface, the conveyance unit includes a second endless belt located upstream of the first endless belt in the sheet conveyance direction, the sheet is supported on a second conveyance surface of the second endless belt, and a downstream end of the second conveyance surface in the sheet conveyance direction is positioned above an upstream, in the sheet conveyance direction, end of the first conveyance surface in a vertical direction.

6. An image forming apparatus comprising:

a transfer unit including a transfer nip portion configured to nip and convey a sheet, the transfer unit being configured to transfer a toner image borne on an image bearing member onto the sheet nipped by the transfer nip portion;

a fixing unit including a fixing nip portion configured to nip and convey the sheet, the fixing unit being configured to fix the toner image transferred onto the sheet by the transfer unit on the sheet;

a conveyance unit configured to convey the sheet from the transfer unit toward the fixing unit, the conveyance unit including:

an endless belt configured to convey the sheet is supported on an upper surface of the endless belt;

a plurality of supporting portions configured to support the endless belt and including a first supporting portion and a second supporting portion, the first supporting portion being located at the highest position among the plurality of supporting portions, the second supporting portion being located at the second highest position among the plurality of supporting portions;

a first suction fan disposed between the first supporting portion and the second supporting portion in a sheet conveyance direction and configured to suck the sheet onto the upper surface; and a second suction fan disposed between the first supporting portion and the second supporting portion in the sheet conveyance direction and configured to suck the sheet onto the upper surface, wherein the second suction fan is disposed upstream of the first suction fan; and a control unit configured to control a suction force of the first suction fan and a suction force of the second suction fan so that:

the suction force of the first suction fan is smaller than the suction force of the second suction fan before a leading end of the sheet reaches the fixing nip portion; and the suction force of the first suction fan remains smaller than the suction force of the second suction fan in a state where the leading end of the sheet reaches the fixing nip portion.

7. The image forming apparatus according to claim 6, wherein:

the first supporting portion is a first supporting roller configured to support the endless belt, and the second supporting portion is a second supporting roller configured to support the endless belt.

8. The image forming apparatus according to claim 7, wherein the upper surface onto which the first suction fan and the second suction fan suck the sheet is arranged parallel to a common tangent line to the first supporting roller and the second supporting roller.

9. The image forming apparatus according to claim 7, wherein the control unit is configured to change the suction force of the first suction fan based on a grammage of the sheet conveyed by the endless belt.

10. The image forming apparatus according to claim 7, wherein:

the endless belt is a first endless belt, and the upper surface is a first upper surface, the conveyance unit includes a second endless belt located upstream of the first endless belt in the sheet conveyance direction, the sheet is supported on a second upper surface of the second endless belt, and a downstream end of the second upper surface in the sheet conveyance direction is positioned above an upstream, in the sheet conveyance direction, end of the first upper surface in a vertical direction.

* * * * *